United States Patent [19]

Imashiro et al.

[11] Patent Number: 6,111,017
[45] Date of Patent: Aug. 29, 2000

[54] CURING AGENT FOR POWDER COATINGS, POWDER COATING COMPOSITION COMPRISING SAID CURING AGENT, AND POWDER COATING FILM

[75] Inventors: Yasuo Imashiro; Ikuo Takahashi; Naofumi Horie; Takeshi Yamane; Shigekazu Suzuki, all of Tokyo, Japan

[73] Assignee: Nisshinbo Industries, Inc., Tokyo, Japan

[21] Appl. No.: 09/081,050

[22] Filed: May 19, 1998

[30] Foreign Application Priority Data

May 19, 1997 [JP] Japan ................................. 9-144776

[51] Int. Cl.⁷ ..................................... C08G 18/80
[52] U.S. Cl. ............................ 525/123; 528/44; 528/45; 528/49; 528/69; 525/440
[58] Field of Search ................ 528/49, 45, 44, 528/69; 525/123, 440

[56] References Cited

U.S. PATENT DOCUMENTS 4,366,288  12/1982  Resz et al. ............................ 525/60
5,650,476  7/1997  Amano ................................. 528/44

FOREIGN PATENT DOCUMENTS 767188  4/1997  European Pat. Off. .

*Primary Examiner*—Rachel Gorr
*Attorney, Agent, or Firm*—Kubovcik & Kubovcik

[57] ABSTRACT

The present invention provides:

(A) a curing agent for powder coatings, which comprises, as a main component, a carbodiimide compound represented by the following general formula (1), (2) or (3):

$$OCN-R_1-(NCN-R_2)_{n1}-NCO \quad (1)$$

$$R_3-NCN-R_4-(NCN-R_5)_{n2}-NCN-R_6 \quad (2)$$

$$R_7-R_8-(NCN-R_9)_{n3}-R_{10} \quad (3)$$

(B) a powder coating composition comprising:
  at least one kind of the above curing agent (A) for powder coating, and
  a bifunctional resin compound having a functional group reactive with carbodiimide group; and (C) powder coating film, which is obtained by reacting and curing at least one kind of the above curing agent (A) for powder coating, and a bifunctional resin compound having a functional group reactive with carbodiimide group.

6 Claims, No Drawings

CURING AGENT FOR POWDER COATINGS, POWDER COATING COMPOSITION COMPRISING SAID CURING AGENT, AND POWDER COATING FILM

BACKGROUND OF THE INVENTION (1) Field of the Invention

The present invention relates to a curing agent for powder coatings, a powder coating composition comprising said curing agent, and powder coating film. More particularlly, the present invention relates to a curing agent for powder coatings which comprises a highly reactive carbodiimide compound, the powder coating composition which comprises said curing agent, and can be baked at low temperatures and gives no adverse effect on the environment where this composition is applied as powder coating film.

(2) Related Art

As environmental problems become increasingly serious, coatings used in the coating industry are being rapidly changed from solvent type coatings to aqueous coatings, high-solid coatings (in which the amount of solvent is reduced in such an extent that the operability or the properties of the formed film are not impaired), electron beam- or ultraviolet-curing coatings, and powder coatings. Of them, the aqueous coatings, however, have various problems as follows. They cause rusting of applicator, dryer, etc. because they use water as a diluent; they need a large energy for drying of the water used as a diluent and are not economical; and the coating film formed has low water resistance because the resin used therein is hydrophilic.

The high-solid coatings, which use a very small amount of a solvent or no solvent and has a very high solution viscosity, are difficult to make into a thin film and therefore cannot be applied by an ordinary applicator. The electron beam-or ultraviolet-curing coatings require, at the curing zone, a special apparatus capable of applying a light, in place of a heating type dryer, and therefore need a large investment.

Under such a situation, the powder coatings, which are one of the next-generation coatings, are drawing the highest attention, and various application methods therefor have been developed such as electrostatic application, fluidized dipping, spraying and the like. These application methods have various advantages. That is, no odor or no hazardous substance is generated because of no use of solvent; the loss of coating is small; the recovery of oversprayed coating is easy, resulting in higher economy; no complicated application technique is needed, making possible automated, rational application.

Moreover, the powder coatings are superior in abrasion resistance, chemical resistance, acid resistance, water resistance, solvent resistance and impact resistance; therefore, they are finding wide usages in coating of automobiles, electrical appliances, cladding panels, guard rails, furniture, etc.

Conventional powder coatings, however, have had considerable restriction in utilization because they need very high baking temperatures of 160 to 230° C., and the high baking temperature has necessitated use of a substrate of high heat resistance.

Conventional powder coatings have further had a problem when they are a polyester/urethane type coating. That is, since this type uses a blocked isocyanate as a curing agent, the coating generates, during baking, a harmful volatile organic compound (VOC) derived from the curing agent and the compound poses an odor problem.

The present invention has been completed in order to alleviate the above-mentioned problems of conventional powder coatings and provide:

a powder coating composition which retains various properties (e.g. excellent curability) possessed by ordinary powder coatings; can be baked at low temperatures and therefore can be applied with conventional equipment used in application of solvent type coatings; generates no harmful volatile organic compound during the baking or heating; can be applied even onto a substrate of low heat resistance or onto a substrate which has too large a heat capacity and which is difficult to heat to a desired application temperature when used for conventional powder coatings; and is low in running cost or maintenance cost;

a curing agent used in the above powder coating composition; and powder coating film.

SUMMARY OF THE INVENTION

According to the present invention, there are provided:

(A) a curing agent for powder coatings, which comprises, as a main component, a carbodiimide compound represented by the following general formula (1), (2) or (3):

$$\text{OCN}-R_1-(\text{NCN}-R_2)_{n1}-\text{NCO} \qquad (1)$$

(wherein $R_1$ and $R_2$ may be the same or different and are each a residue of an aliphatic, alicyclic or aromatic diisocyanate; and n1 is an integer of 2 to 50), $$R_3-\text{NCN}-R_4-(\text{NCN}-R_5)_{n2}-\text{NCN}-R_6 \qquad (2)$$

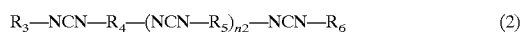

(wherein $R_4$ and $R_5$ may be the same or different and are each a residue of an aliphatic, alicyclic or aromatic diisocyanate; $R_3$ and $R_6$ may be the same or different and are each a residue of an aliphatic, alicyclic or aromatic monoisocyanate; and n2 is an integer of 0 to 48), $$R_7-R_8-(\text{NCN}-R_9)_{n3}-R_{10} \qquad (3)$$

(wherein $R_8$ and $R_9$ may be the same or different and are each a residue of an aliphatic, alicyclic or aromatic diisocyanate; $R_7$ and $R_{10}$ may be the same or different and are each a residue formed by the reaction of an isocyanate group with an alcohol, an amine, a carboxylic acid or an acid anhydride; and n3 is an integer of 2 to 50), (B) a powder coating composition comprising:
  at least one kind of the above curing agent (A) for powder coatings, and
  a bifunctional resin compound having a functional group reactive with carbodiimide group; and (C) powder coating film, which is obtained by reacting and curing at least one kind of the above curing agent (A) for powder coatings, and a bifunctional resin compound having a functional group reactive with carbodiimide group.

DETAILED DESCRIPTION OF THE INVENTION

The present invention is hereinafter described in detail.

The powder coatings intended by the present invention is a powder coatings comprising a coating resin compound of fine powder state having particle diameters of 1 to 100 μm, preferably 1–50 μm. As the resin compound, there is used an epoxy resin, an epoxy/polyester resin, a polyester resin, a polyester/urethane resin, an acrylic resin or the like.

The curing agent of the present invention is used in the above powder coatings and comprises a carbodiimide compound represented by the above general formula, as a main component. The carbodiimide compound can be produced by subjecting an isocyanate to a carbodiimidization reaction wherein carbon dioxide is removed, or by dehydrating or desulfurizing urea or thiourea.

The carbodiimidization reaction is conducted in the presence of an appropriate carbodiimidization catalyst. Suitable as the carbodiimidization catalyst are organic phosphorus compounds and organometal compounds represented by the general formula M—(OR)$_4$ (wherein M is a metal atom of Ti, Na, K, V, W, Hf, Zr, Pb, Mn, Ni, Ca, Ba or the like; and R is an alkyl group having 1 to 20 carbon atoms, or an aryl group). Particularly preferable are phosphorene oxides (organic phosphorus compounds) and alkoxides of Ti, Hf or Zr (organometal compounds) for their activities.

The phosphorene oxides can be exemplified by 3-methyl-1-phenyl-2-phosphorene-1-oxide, 3-methyl-1-ethyl-2phosphorene-1-oxide, 1,3-dimethyl-2-phosphorene-1-oxide, 1-phenyl-2-phosphorene-1-oxide, 1-ethyl-2-phosphorene-1-oxide, 1-methyl-2-phosphorene-1-oxide, and double bond isomers thereof. Of these, 3-methyl-1-phenyl-2-phosphorene-1-oxide is particularly preferable for the industrial availability.

Particularly preferable as the alkoxides of Ti, Hf or Zr are those which are in industrial use as a catalyst for ester condensation and easily available, such as tetraisopropylalkoxide, tetrabutylalkoxide, tetra-2-ethylhexylalkoxide or the like of Ti, Hf or Zr.

The carbodiimidization reaction can be conducted according to a known process. That is, to a raw material, for example, 4,4'-dicyclohexylmethane diisocyanate is added 0.1 to 10% by weight (a larger amount is possible when the economy is neglected), preferably 0.5 to 5% by weight, based on the total isocyanate, of the above-mentioned catalyst in the presence or absence of a solvent inert to the raw material, in an inert gas (e.g. nitrogen) current or with the gas being bubbled; the resulting mixture is stirred at a temperature of 150 to 200° C., to give rise to a carbodiimidization reaction wherein removal of carbon dioxide takes place.

The velocity of the carbodiimidization reaction differs depending upon the kind of diisocyanate, the reaction temperature, the amount of catalyst, etc. Since too large a reaction velocity makes difficult the control of polymerization, it is preferred to allow the reaction to proceed in an appropriate catalyst amount and at an appropriate reaction temperature. When, for example, an aliphatic diisocyanate is carbodiimidized, the following conditions are employed:

catalyst amount: 0.1 to 10% by weight, preferably 0.5 to 5% by weight, reaction temperature: 120 to 200° C., and when an aromatic diisocyanate is carbodiimidized, the following conditions are employed:

catalyst amount: 0.01 to 5% by weight, preferably 0.05 to 1% by weight, reaction temperature: 50 to 180° C.

The carbodiimide compound produced as above is preferably one having 2 to 50, preferably 3 to 30 carbodiimide groups, because it has a low melting point and a low viscosity and is easily dispersed in or mixed with a resin to be used as the main component of powder coating.

In the above carbodiimidization reaction, when the raw material isocyanate is a diisocyanate, there can be obtained a carbodiimide compound represented by the following general formula (1):

$$OCN-R_1-(NCN-R_2)_{n1}-NCO \quad (1)$$

(wherein $R_1$ and $R_2$ may be the same or different and are each a residue obtained by removing isocyanate groups from an aliphatic, alicyclic or aromatic diisocyanate, for example, a residue obtained by removing isocyanate groups from 4,4'-dicyclohexyl-methane diisocyanate, tetramethylxylylene diisocyanate, isophorone diisocyanate, 2,4,6-triisopropylphenyl diisocyanate, 4,4'-diphenylmethane diisocyanate, tolylene diisocyanate or hydrogenated tolylene diisocyanate; and n1 is an integer of 2 to 50). When the raw material diisocyanate is a combination of two or more kinds of diisocyanates, the polymerization mode used may be random polymerization or block polymerization.

The carbodiimide compound used in the present invention may also be a compound obtained by subjecting an isocyanate-terminated carbodiimide compound obtained as above, i.e. a compound of the general formula (1), to terminal blocking with a compound(s) reactive with isocyanate, such as monoisocyanate(s), amine(s), carboxylic acid(s), acid anhydride(s) or the like.

The monoisocyanate(s) used for terminal blocking of the carbodiimide compound can be exemplified by aliphatic isocyanates such as butyl isocyanate and the like; alicyclic isocyanates such as cyclohexyl isocyanate and the like; and aromatic isocyanates such as phenyl isocyanate, 2,6-diisopropylphenyl isocyanate and the like. These monoisocyanates can be used singly or in admixture of two or more kinds.

By subjecting a carbodiimide compound represented by the general formula (1) to terminal blocking with a monoisocyanate(s), there can be obtained a carbodiimide compound represented by the following general formula (2):

$$R_3-NCN-R_4-(NCN-R_5)_{n2}-NCN-R_6 \quad (2)$$

(wherein $R_4$ and $R_5$ may be the same or different and are each a residue obtained by removing isocyanate groups from an aliphatic, alicyclic or aromatic diisocyanate, for example, a residue obtained by removing isocyanate groups from 4,4'-dicyclohexyl-methane diisocyanate, tetramethylxylylene diisocyanate, isophorone diisocyanate, 2,4,6-triisopropylphenyl diisocyanate, 4,4'-diphenylmethane diisocyanate, tolylene diisocyanate or hydrogenated tolylene diisocyanate; $R_3$ and $R_6$ may be the same or different and are each a residue obtained by removing isocyanate group from an aliphatic, alicyclic or aromatic monoisocyanate, for example, a residue obtained by removing isocyanate group from a lower ($C_{1-6}$) alkyl isocyanate or an isomer thereof, cyclohexyl isocyanate, phenyl isocyanate or 2,6-diisopropylphenyl isocyanate; and n2 is an integer of 0 to 48).

In producing a carbodiimide compound of the general formula (2), it is preferable to mix a diisocyanate and a monoisocyanate beforehand and subject the mixture to carbodiimidization, because such a practice can reduce the amount of a monocarbodiimide formed by condensation of monoisocyanate molecules and a carbodiimide compound of desired molecular weight can be obtained.

In the carbodiimide compound represented by the general formula (2), the proportion of diisocyanate and monoisocyanate is 1:2 to 30:2, preferably 4:2 to 19:2. When the proportion is 3:2 (molar ratio), the number of carbodiimide in molecule, i.e. n is 4 and, when the proportion is 19:2 (molar ratio), n is 20.

When the carbodiimide compound represented by the general formula (1) is subjected to terminal blocking with a monofunctional compound having a group reactive with isocyanate group, for example, an alcohol(s), an amine(s), a carboxylic acid(s) or an acid anhydride(s), there can be obtained a compound represented by the following general formula (3):

$$R_7-R_8-(NCN-R_9)_{n3}-R_{10} \quad (3)$$

(wherein $R_8$ and $R_9$ may be the same or different and are each a residue obtained by removing isocyanate groups from an aliphatic, alicyclic or aromatic diisocyanate, for example, a residue obtained by removing isocyanate groups from 4,4'-dicyclohexylmethane diisocyanate, tetramethylxylylene diisocyanate, isophorone diisocyanate, 2,4,6-triisopropylphenyl diisocyanate, 4,4'-diphenylmethane diisocyanate, tolylene diisocyanate or hydrogenated tolylene diisocyanate; $R_7$ and $R_{10}$ may be the same or different and are each a residue formed by the reaction of an isocyanate group with an alcohol, an amine, a carboxylic acid or an acid anhydride; and n3 is an integer of 2 to 50).

In the reaction for obtaining the carbodiimide compound represented by the general formula (1), (2) or (3), the reaction time varies depending upon the reaction temperature, the kind and/or amount of catalyst, etc. However, for example, when 4,4-dicyclohexylmethane diisocyanate (HMDI) is used as a raw material and is reacted with 0.5% by weight, based on the total isocyanate, of 3-methyl-1-phenyl-2-phosphorene-1-oxide at 180° C. in a solvent-less state, there can be obtained in about 10 hours an isocyanate-terminated carbodiimide compound (polymerization degree n=3) derived from HMDI.

The polymerization time is the same also when isophorone diisocyanate (IPDI) is used as a raw material. When 2,4,6-triisopropylbenzene diisocyanate is used as a raw material and is reacted with 0.3% by weight, based on the total isocyanate, of 3-methyl-1-phenyl-2-phosphorene-1-oxide at 120° C. in a solvent-less state, there can be obtained in about 6 hours an isocyanate-terminated carbodiimide compound (polymerization degree n=5) derived from 2,4,6-triisopropylbenzene diisocyanate.

The proceeding of the above reaction can be ascertained by examining the absorption of isocyanate group at 2,258 $cm^{-1}$ in IR absorption spectrum, or by titrimetry.

When the terminal isocyanate groups of the carbodiimide compound represented by the general formula (1) are blocked with a monofunctional compound(s) having a group reactive with isocyanate group, for example, an alcohol(s), an amine(s), a carboxylic acid(s) or an acid anhydride(s), the reaction between the isocyanate groups and the blocking agent(s) may be conducted before carbodiimidization, or by conducting carbodiimidization to an appropriate polymerization degree and then adding a blocking agent(s) of an amount equivalent to the remaining isocyanate. However, when the terminal-blocking agent(s) has (have) a low boiling point and vaporizes (vaporize) owing to the heat of carbodiimidization reaction, it is preferred to react isocyanate with the blocking agent(s) prior to carbodiimidization.

The thus-produced carbodiimide compound can be obtained in the form of a slurry, a solution or a gel when a solvent is used in the production, and in the form of a liquid (which becomes a solid at room temperature) when no solvent is used in the production. Isolation of the carbodiimide compound from the solvent-containing reaction mixture can be conducted by an ordinary method for solvent removal, for example, spray drying, solvent distillation under reduced pressure or atmospheric pressure, or conical drying. In isolation of the carbodiimide compound from the slurry-like reaction mixture, filtration or other method can also be used.

The thus-obtained carbodiimide compound (including one produced using no solvent) can be ground as necessary. There is no particular restriction as to the grinding method. There can be used, for example, grinding by collision using a jet mill or the like, or grinding by compression, friction and shear using a rotor or the like.

The curing agent for powder coatings, of the present invention comprises the above carbodiimide compound as a main component. As necessary, the curing agent can be used in combination with other conventional curing agent, for example, an aliphatic or aromatic amine, an acid anhydride, phenol, dihydrazide, dicyandiamide, an acid group-containing polyester, a blocked isocyanate, or a dibasic acid; and in this case as well, a good curing property and a satisfactory coating film can be obtained.

The powder coating composition of the present invention comprises: at least one kind of the above curing agent for powder coatings, and a bifunctional coating resin compound having a functional group reactive with carbodiimide group (i.e., powder coating).

In the powder coating composition, the proportion of the curing agent and the coating resin compound can be, for example, (number of carbodiimide groups in curing agent) :(number of groups reactive with carbodiimide group, in the coating resin compound)=1:1 to 1:3. When the amount of the curing agent is less than in the above proportion, the curing of the coating resin compound is insufficient. When the amount of the curing agent is more than in the above proportion, various properties of the coating resin compound are impaired.

Preparation of the present powder coating composition using the present curing agent for powder coating can be conducted, for example, by dry-blending the present curing agent and the above-mentioned coating resin compound, or by adding the curing agent to the powder coating being melt-kneaded and grinding the resulting pellets.

The powder coating film, according to the present invention, is obtained by reacting and curing at least one kind of the above curing agent for powder coating, and a bifunctional resin compound having a functional group reactive with carbodiimide group.

More particularly, the powder coating film, according to the present invention, is obtained by, for example, adhering a mixture of the curing agent and the coating resin compound onto a substrate by electrostatic application, fluidized dipping, spraying or the like, and conducting baking to give rise to a crosslinking reaction and form a cured coating film.

In the application of the powder coating composition according to the present invention, the baking temperature is 100–230° C. as compared with 160–230° C. in application of conventional powder coatings, because the present powder coating composition uses a curing agent having carbodiimide group of high reactivity. As a result, in the application of the powder coating composition according to the present invention, baking is possible even in a temperature range of 100 to 150° C.; therefore, the energy cost can be lower and the substrate (to which application is made) can be selected from a variety of materials.

The baking time differs depending upon the baking temperature, the thickness of powder coating composition adhered on substrate, and the thermal conductivity of substrate; however, it can be 10 to 60 minutes when the baking temperature is in the range of 100 to 150° C.

The powder coating film obtained by the application of the present powder coating composition according to the present invention has excellent properties (e.g. excellent heat resistance) because, in the film, the coating resin compound is crosslinked by the curing agent comprising a carbodiimide compound as a main component.

The present invention is described in detail below by way of Examples.

In the following Synthesis Examples, the symbols in abbreviated form, shown in Tables 1 to 6 refer to the followings.

Isocyanates
  CHI: Cyclohexyl isocyanate
  DII: 2,6-Diisopropylphenyl isocyanate
  HMDI: 4,4-Dicyclohexylmethane diisocyanate
  IPDI: Isophorone diisocyanate
  TMXDI: Tetramethylxylylene diisocyanate
  TIDI: 2,4,6-Triisopropylphenyl diisocyanate
  TDI: a mixture of 2,4-Tolylene diisocyanate and 2,6-tolylene diisocyanate
  MDI: 4,4'-Diphenylmethane diisocyanate
  TODI: Tolidine diisocyanate
  XDI: Xylylene diisocyanate
  H6XDI: Hydrogenated xylylene diisocyanate
  HDI: Hexamethylene diisocyanate
  NDI: Naphthalene diisocyanate
Blocking Agents
  CHI: Cyclohexyl isocyanate
  n-Bu: n-Butyl isocyanate
  DII: 2,6-Diisopropylphenyl isocyanate
  Ph: Phenyl isocyanate
  CHA: Cyclohexylamine
  CHOH: Cyclohexanol
  PEG3: Polyethylene glycol monomethyl ether (number of ethylene groups=3)
  PEG8: Polyethylene glycol monomethyl ether (number of ethylene groups=8)
  n-BuA: n-Butylamine
  DBA: Dibutylamine
  DCA: Dicyclohexylamine

SYNTHESIS EXAMPLES 1 to 12

NCO-Terminated Carbodiimides 1.5 g of a carbodiimidization catalyst (3-methyl-1-phenyl-2-phosphorene-1-oxide [same catalyst was also used in the following Synthesis Examples]) was added to 300 g of HMDI. The mixture was subjected to a condensation reaction in a nitrogen current at 185° C. for 10 hours, with stirring at 200 rpm by the use of a mechanical stirrer, whereby a NCO-terminated carbodiimide (polymerization degree=5) derived from HMDI, of Synthesis Example 1 was obtained.

Also, NCO-terminated carbodiimides of Synthesis Examples 2 to 12 were obtained in the same manner as in Synthesis Example 1 except that the kind of diisocyanate, the amount of catalyst and the reaction conditions (temperature and time) were changed as shown in Table 1. In each of Synthesis Examples 1 and 2 to 6, obtained solid NCO-terminated carbodiimide was ground using a jet mill, and in each of Synthesis Examples 7 to 12, the reaction was conducted in a Perclene (a solvent) (the amount: 20% of the raw material diisocyanate), and the resulting slurry was spray-dried, to obtain a carbodiimide compound in a fine powder form having an average particle diameter of 10 μm.

TABLE 1

| No | Diisocyanate | Amount (g) | Catalyst amount (g) | Reaction conditions (° C.-time) | Polymerization degree | Others |
|---|---|---|---|---|---|---|
| 1 | HMDI | 300 | 1.5 | 185–10 | 5 | |
| 2 | ↑ | ↑ | ↑ | 185–17 | 10 | |
| 3 | IPDI | 300 | 1.5 | 185–12 | 5 | |
| 4 | ↑ | ↑ | ↑ | 185–16 | 10 | |
| 5 | TIDI | 300 | 1.5 | 180–8 | 5 | |
| 6 | ↑ | ↑ | ↑ | 180–12 | 10 | |
| 7 | MDI | 300 | 0.3 | 120–9 | 5 | Perclene |
| 8 | ↑ | ↑ | ↑ | 120–12 | 10 | Perclene |
| 9 | TODI | 300 | 1 | 120–10 | 5 | Perclene |
| 10 | ↑ | ↑ | ↑ | 120–14 | 10 | Perclene |
| 11 | NDI | 300 | 1 | 120–11 | 5 | Perclene |
| 12 | ↑ | ↑ | ↑ | 120–14 | 10 | Perclene |

SYNTHESIS EXAMPLES 13 to 24

Terminal-Monoisocyanate Blocked Carbodiimides

To 105 g of HMDI were added 25 g of cyclohexyl isocyanate (a monoisocyanate) and 1.3 g of a carbodiimidization catalyst. The mixture was subjected to a reaction at 185° C. for 14 hours with stirring at 200 rpm by the use of a mechanical stirrer, to obtain a terminal-monoisocyanate blocked carbodiimide (polymerization degree=5) of Synthesis Example 13.

Terminal-monoisocyanate blocked carbodiimides of Synthesis Examples 14 to 24 were obtained in the same manner as in Synthesis Example 13 except that the kind and amount of diisocyanate, the kind and amount of monoisocyanate, the amount of catalyst, and the reaction conditions (temperature and time) were changed as shown in Table 2. In each of Synthesis Examples 13 and 14 to 18, obtained solid NCO-terminated carbodiimide was ground using a jet mill, and in each of Synthesis Examples 19 to 24, the reaction was conducted in a Perclene (a solvent) (the amount: 20% of the raw material diisocyanate), and the resulting slurry was spray-dried, to obtain a carbodiimide compound in a fine powder form having an average particle diameter of 10 μm.

TABLE 2

| No | Diisocyanate | Amount (g) | Blocking agent | Amount (g) | Catalyst amount (g) | Reaction conditions (° C.-time) | Polymerization degree | Others |
|---|---|---|---|---|---|---|---|---|
| 13 | HMDI | 105 | CHI | 25 | 1.3 | 185–14 | 5 | |
| 14 | ↑ | 236 | ↑ | ↑ | 2.6 | 185–20 | 10 | |
| 15 | IPDI | 89 | CHI | 25 | 0.9 | 185–15 | 5 | |
| 16 | ↑ | 200 | ↑ | ↑ | 2.0 | 185–22 | 10 | |
| 17 | TIDI | 257 | DII | 41 | 1.3 | 170–12 | 10 | |
| 18 | ↑ | 543 | ↑ | ↑ | 2.7 | 170–19 | 20 | |
| 19 | MDI | 100 | Ph | 24 | 0.12 | 120–5 | 5 | Perclene |
| 20 | ↑ | 225 | ↑ | ↑ | 0.25 | 120–14 | 10 | Perclene |
| 21 | TODI | 106 | Ph | 24 | 0.39 | 120–7 | 5 | Perclene |

TABLE 2-continued

| No | Diisocyanate | Amount (g) | Blocking agent | Amount (g) | Catalyst amount (g) | Reaction conditions (° C.-time) | Polymerization degree | Others |
|---|---|---|---|---|---|---|---|---|
| 22 | ↑ | 238 | ↑ | ↑ | 0.79 | 120–12 | 10 | Perclene |
| 23 | NDI | 106 | Ph | 24 | 0.41 | 120–6 | 5 | Perclene |
| 24 | ↑ | 232 | ↑ | ↑ | 0.80 | 120–12 | 10 | Perclene |

SYNTHESIS EXAMPLES 25 to 61

Terminal-Monoisocyanate Blocked Carbodiimides 20 g of cyclohexylamine (a terminal-blocking agent) was added to 236 g of HMDI. The mixture was stirred at 100° C. for 1 hour with bubbling nitrogen therethrough. Then, 2.4 g of a carbodiimidization catalyst was added and a reaction was allowed to take place at 185° C. for 23 hours, to obtain a carbodiimide (polymerization degree=10) derived from HMDI and having a urea bond at each terminal, of Synthesis Example 25.

Carbodiimide compounds of Synthesis Examples 26 to 61 each having, in the molecule, urea bond, urethane bond, imide bond or amide bond were obtained in the same manner as in Synthesis Example 25 except that the kind and amount of diisocyanate, the amount of catalyst, the reaction conditions (temperature and time) and the kind and amount of terminal-blocking agent were changed as shown in Table 3.

In each of Synthesis Examples 25 and 26 to 46, obtained solid NCO-terminated carbodiimide was ground using a jet mill, and in each of Synthesis Examples 47 to 61, the reaction was conducted in a Perclene (a solvent) (the amount: 20% of the raw material diisocyanate), and the resulting slurry was spray-dried, to obtain a carbodiimide compound in a fine powder form having an average particle diameter of 10 μm.

TABLE 3

| No | Diisocyanate | Amount (g) | Blocking agent | Amount (g) | Catalyst amount (g) | Reaction conditions (° C.-time) | Polymerization degree | Others |
|---|---|---|---|---|---|---|---|---|
| 25 | HMDI | 236 | CHA | 20 | 2.4 | 185–23 | 10 | |
| 26 | ↑ | 524 | ↑ | ↑ | 5.2 | 185–32 | 20 | |
| 27 | HMDI | 236 | CHOH | 20 | 2.4 | 185–26 | 10 | |
| 28 | ↑ | 524 | ↑ | ↑ | 5.2 | 185–35 | 20 | |
| 29 | HMDI | 236 | n-BuA | 15 | 1.2 | 180–17 | 10 | |
| 30 | ↑ | ↑ | DBA | 26 | ↑ | 180–19 | ↑ | |
| 31 | ↑ | ↑ | DCA | 36 | ↑ | 180–17 | ↑ | |
| 32 | IPDI | 200 | CHA | 20 | 2.0 | 185–26 | 10 | |
| 33 | ↑ | 422 | ↑ | ↑ | 4.2 | 185–38 | 20 | |
| 34 | IPDI | 200 | CHOH | 20 | 2.0 | 185–25 | 10 | |
| 35 | ↑ | 422 | ↑ | ↑ | 4.2 | 185–35 | 20 | |
| 36 | IPDI | 200 | n-BuA | 15 | 2.0 | 180–21 | 10 | |
| 37 | ↑ | ↑ | DBA | 26 | ↑ | 180–21 | ↑ | |
| 38 | ↑ | ↑ | DCA | 36 | ↑ | 180–19 | ↑ | |
| 39 | ↑ | 464 | ↑ | ↑ | 9.3 | 180–41 | 20 | |
| 40 | TIDI | 257 | CHA | 20 | 1.5 | 170–15 | 10 | |
| 41 | ↑ | 543 | ↑ | ↑ | 2.9 | 170–20 | 20 | |
| 42 | TIDI | 257 | CHOH | 20 | 1.5 | 170–17 | 10 | |
| 43 | ↑ | 543 | ↑ | ↑ | 29 | 170–22 | 20 | |
| 44 | TIDI | 257 | n-BuA | 15 | 1.5 | 170–18 | 10 | |
| 45 | ↑ | ↑ | DBA | 26 | ↑ | 170–18 | ↑ | |
| 46 | ↑ | ↑ | DCA | 36 | ↑ | 170–17 | ↑ | |
| 47 | TODI | 238 | CHA | 20 | 0.71 | 130–10 | 10 | Perclene |
| 48 | ↑ | 508 | ↑ | ↑ | 1.5 | 130–12 | 20 | Perclene |
| 49 | TODI | 238 | CHOH | 20 | 0.71 | 130–10 | 10 | Perclene |
| 50 | ↑ | 508 | ↑ | ↑ | 1.5 | 130–12 | 20 | Perclene |
| 51 | TODI | 238 | n-BuA | 15 | 0.71 | 120–15 | 10 | Perclene |
| 52 | ↑ | ↑ | DBA | 26 | ↑ | 120–17 | ↑ | Perclene |
| 53 | ↑ | ↑ | DCA | 36 | ↑ | 120–16 | ↑ | Perclene |
| 54 | MDI | 225 | CHA | 20 | 0.25 | 120–15 | 10 | Perclene |
| 55 | ↑ | 475 | ↑ | ↑ | 0.5 | 120–20 | 20 | Perclene |
| 56 | MDI | 225 | CHOH | 20 | 0.25 | 120–14 | 10 | Perclene |
| 57 | ↑ | 475 | ↑ | ↑ | 0.5 | 120–20 | 20 | Perclene |
| 58 | NDI | 232 | CHA | 20 | 0.80 | 120–12 | 10 | Perclene |
| 59 | ↑ | 443 | ↑ | ↑ | 1.54 | 120–22 | 20 | Perclene |
| 60 | NDI | 232 | CHOH | 20 | 0.80 | 120–12 | 10 | Perclene |
| 61 | ↑ | 443 | ↑ | ↑ | 1.54 | 120–22 | 20 | Perclene |

RESIN SYNTHESIS EXAMPLE 1

Resin A

There were mixed 1,746 g of dimethyl terephthalate, 416 g of 2,2-dimethylpropane-1,3-diol, 540 g of 1,4-dimethylolcyclohexane and 335 g of trimethylolpropane. The mixture was heated to 160° C. to make it almost solution-like. Thereto was added di-n-butyltin oxide in an amount of 0.1% by weight. The mixture was reacted at 185° C. for 3 hours and further at 230° C. for 10 hours to obtain a polyester (hereinafter referred to as resin A). Thus obtained polyester was cooled followed by freezdrying and grinding. The ground polyester was classfied to obtain a polyester as a powder having a diameter of 100 μm or less. This polyester had a melting point of about 90° C.

RESIN SYNTHESIS EXAMPLE 2

Resin B

There were mixed 1,495 g of terephthalic acid, 1,748 g of dimethyl terephthalate, 354 g of hexane-1,6-diol, 1,354 g of neopentyl glycol, 432 g of 1,4-dimethylolcyclohexane and 134 g of trimethylolpropane. The mixture was heated to 160° C. to make it almost solution-like. Thereto was added di-n-butyltin oxide in an amount of 0.1% by weight. The mixture was reacted at 185° C. for 3 hours and further at 230° C. for 10 hours to obtain a polyester (hereinafter referred to as resin B). Thus obtained polyester was cooled followed by freezdrying and grinding. The ground polyester was classfied to obtain a polyester as a powder having a diameter of 100 μm or less. This polyester had a melting point of about 80° C.

EXAMPLE 1

Curing Agents for Powder Coatings

Each of the carbodiimide compounds obtained as a fine powder in the above Synthesis Examples 1 to 61 was used as a curing agent for powder coatings, of the present invention, in the following Example 2.

EXAMPLE 2

Powder Coating Compositions

Powder coating composition Nos. 1 to 122 of the present invention were prepared according to the formulations shown in Tables 4 to 7, by a known method.

TABLE 4

| Composition No. | Resin A (g) | Carbodiimide/amount (g) | White pigment $TiO_2$ (g) | Poly-acrylate |
|---|---|---|---|---|
| 1 | 550 | Synthesis Example 1/300 | 240 | 4 |
| 2 | 550 | Synthesis Example 2/300 | 240 | 4 |
| 3 | 550 | Synthesis Example 3/300 | 240 | 4 |
| 4 | 550 | Synthesis Example 4/300 | 240 | 4 |
| 5 | 550 | Synthesis Example 5/300 | 240 | 4 |
| 6 | 550 | Synthesis Example 6/300 | 240 | 4 |
| 7 | 550 | Synthesis Example 7/300 | 240 | 4 |
| 8 | 550 | Synthesis Example 8/300 | 240 | 4 |
| 9 | 550 | Synthesis Example 9/300 | 240 | 4 |
| 10 | 550 | Synthesis Example 10/300 | 240 | 4 |
| 11 | 550 | Synthesis Example 11/300 | 240 | 4 |
| 12 | 550 | Synthesis Example 12/300 | 240 | 4 |
| 13 | 550 | Synthesis Example 13/300 | 240 | 4 |
| 14 | 550 | Synthesis Example 14/300 | 240 | 4 |
| 15 | 550 | Synthesis Example 15/300 | 240 | 4 |
| 16 | 550 | Synthesis Example 16/300 | 240 | 4 |
| 17 | 550 | Synthesis Example 17/300 | 240 | 4 |
| 18 | 550 | Synthesis Example 18/300 | 240 | 4 |
| 19 | 550 | Synthesis Example 19/300 | 240 | 4 |
| 20 | 550 | Synthesis Example 20/300 | 240 | 4 |
| 21 | 550 | Synthesis Example 21/300 | 240 | 4 |
| 22 | 550 | Synthesis Example 22/300 | 240 | 4 |
| 23 | 550 | Synthesis Example 23/300 | 240 | 4 |
| 24 | 550 | Synthesis Example 24/300 | 240 | 4 |
| 25 | 550 | Synthesis Example 25/300 | 240 | 4 |
| 26 | 550 | Synthesis Example 26/300 | 240 | 4 |
| 27 | 550 | Synthesis Example 27/300 | 240 | 4 |
| 28 | 550 | Synthesis Example 28/300 | 240 | 4 |
| 29 | 550 | Synthesis Example 29/300 | 240 | 4 |
| 30 | 550 | Synthesis Example 30/300 | 240 | 4 |
| 31 | 550 | Synthesis Example 31/300 | 240 | 4 |

TABLE 5

| Composition No. | Resin A (g) | Carbodiimide/amount (g) | White pigment $TiO_2$ (g) | Poly-acrylate |
|---|---|---|---|---|
| 32 | 550 | Synthesis Example 32/300 | 240 | 4 |
| 33 | 550 | Synthesis Example 33/300 | 240 | 4 |
| 34 | 550 | Synthesis Example 34/300 | 240 | 4 |
| 35 | 550 | Synthesis Example 35/300 | 240 | 4 |
| 36 | 550 | Synthesis Example 36/300 | 240 | 4 |
| 37 | 550 | Synthesis Example 37/300 | 240 | 4 |
| 38 | 550 | Synthesis Example 38/300 | 240 | 4 |
| 39 | 550 | Synthesis Example 39/300 | 240 | 4 |
| 40 | 550 | Synthesis Example 40/300 | 240 | 4 |
| 41 | 550 | Synthesis Example 41/300 | 240 | 4 |
| 42 | 550 | Synthesis Example 42/300 | 240 | 4 |
| 43 | 550 | Synthesis Example 43/300 | 240 | 4 |
| 44 | 550 | Synthesis Example 44/300 | 240 | 4 |
| 45 | 550 | Synthesis Example 45/300 | 240 | 4 |
| 46 | 550 | Synthesis Example 46/300 | 240 | 4 |
| 47 | 550 | Synthesis Example 47/300 | 240 | 4 |
| 48 | 550 | Synthesis Example 48/300 | 240 | 4 |
| 49 | 550 | Synthesis Example 49/300 | 240 | 4 |
| 50 | 550 | Synthesis Example 50/300 | 240 | 4 |
| 51 | 550 | Synthesis Example 51/300 | 240 | 4 |
| 52 | 550 | Synthesis Example 52/300 | 240 | 4 |
| 53 | 550 | Synthesis Example 53/300 | 240 | 4 |
| 54 | 550 | Synthesis Example 54/300 | 240 | 4 |
| 55 | 550 | Synthesis Example 55/300 | 240 | 4 |
| 56 | 550 | Synthesis Example 56/300 | 240 | 4 |
| 57 | 550 | Synthesis Example 57/300 | 240 | 4 |
| 58 | 550 | Synthesis Example 58/300 | 240 | 4 |
| 59 | 550 | Synthesis Example 59/300 | 240 | 4 |
| 60 | 550 | Synthesis Example 60/300 | 240 | 4 |
| 61 | 550 | Synthesis Example 61/300 | 240 | 4 |

TABLE 6

| Composition No. | Resin B (g) | Carbodiimide/amount (g) | White pigment $TiO_2$ (g) | Poly-acrylate |
|---|---|---|---|---|
| 62 | 1010 | Synthesis Example 1/300 | 500 | 4 |
| 63 | 1010 | Synthesis Example 2/300 | 500 | 4 |
| 64 | 1010 | Synthesis Example 3/300 | 500 | 4 |
| 65 | 1010 | Synthesis Example 4/300 | 500 | 4 |
| 66 | 1010 | Synthesis Example 5/300 | 500 | 4 |
| 67 | 1010 | Synthesis Example 6/300 | 500 | 4 |
| 68 | 1010 | Synthesis Example 7/300 | 500 | 4 |
| 69 | 1010 | Synthesis Example 8/300 | 500 | 4 |
| 70 | 1010 | Synthesis Example 9/300 | 500 | 4 |
| 71 | 1010 | Synthesis Example 10/300 | 500 | 4 |
| 72 | 1010 | Synthesis Example 11/300 | 500 | 4 |
| 73 | 1010 | Synthesis Example 12/300 | 500 | 4 |
| 74 | 1010 | Synthesis Example 13/300 | 500 | 4 |
| 75 | 1010 | Synthesis Example 14/300 | 500 | 4 |
| 76 | 1010 | Synthesis Example 15/300 | 500 | 4 |
| 77 | 1010 | Synthesis Example 16/300 | 500 | 4 |
| 78 | 1010 | Synthesis Example 17/300 | 500 | 4 |
| 79 | 1010 | Synthesis Example 18/300 | 500 | 4 |
| 80 | 1010 | Synthesis Example 19/300 | 500 | 4 |
| 81 | 1010 | Synthesis Example 20/300 | 500 | 4 |
| 82 | 1010 | Synthesis Example 21/300 | 500 | 4 |
| 83 | 1010 | Synthesis Example 22/300 | 500 | 4 |
| 84 | 1010 | Synthesis Example 23/300 | 500 | 4 |
| 85 | 1010 | Synthesis Example 24/300 | 500 | 4 |
| 86 | 1010 | Synthesis Example 25/300 | 500 | 4 |
| 87 | 1010 | Synthesis Example 26/300 | 500 | 4 |
| 88 | 1010 | Synthesis Example 27/300 | 500 | 4 |
| 89 | 1010 | Synthesis Example 28/300 | 500 | 4 |
| 90 | 1010 | Synthesis Example 29/300 | 500 | 4 |
| 91 | 1010 | Synthesis Example 30/300 | 500 | 4 |
| 92 | 1010 | Synthesis Example 31/300 | 500 | 4 |

TABLE 7

| Composition No. | Resin B (g) | Carbodiimide/ amount (g) | White pigment TiO$_2$ (g) | Poly- acrylate |
|---|---|---|---|---|
| 93 | 1010 | Synthesis Example 32/300 | 500 | 4 |
| 94 | 1010 | Synthesis Example 33/300 | 500 | 4 |
| 95 | 1010 | Synthesis Example 34/300 | 500 | 4 |
| 96 | 1010 | Synthesis Example 35/300 | 500 | 4 |
| 97 | 1010 | Synthesis Example 36/300 | 500 | 4 |
| 98 | 1010 | Synthesis Example 37/300 | 500 | 4 |
| 99 | 1010 | Synthesis Example 38/300 | 500 | 4 |
| 100 | 1010 | Synthesis Example 39/300 | 500 | 4 |
| 101 | 1010 | Synthesis Example 40/300 | 500 | 4 |
| 102 | 1010 | Synthesis Example 41/300 | 500 | 4 |
| 103 | 1010 | Synthesis Example 42/300 | 500 | 4 |
| 104 | 1010 | Synthesis Example 43/300 | 500 | 4 |
| 105 | 1010 | Synthesis Example 44/300 | 500 | 4 |
| 106 | 1010 | Synthesis Example 45/300 | 500 | 4 |
| 107 | 1010 | Synthesis Example 46/300 | 500 | 4 |
| 108 | 1010 | Synthesis Example 47/300 | 500 | 4 |
| 109 | 1010 | Synthesis Example 48/300 | 500 | 4 |
| 110 | 1010 | Synthesis Example 49/300 | 500 | 4 |
| 111 | 1010 | Synthesis Example 50/300 | 500 | 4 |
| 112 | 1010 | Synthesis Example 51/300 | 500 | 4 |
| 113 | 1010 | Synthesis Example 52/300 | 500 | 4 |
| 114 | 1010 | Synthesis Example 53/300 | 500 | 4 |
| 115 | 1010 | Synthesis Example 54/300 | 500 | 4 |
| 116 | 1010 | Synthesis Example 55/300 | 500 | 4 |
| 117 | 1010 | Synthesis Example 56/300 | 500 | 4 |
| 118 | 1010 | Synthesis Example 57/300 | 500 | 4 |
| 119 | 1010 | Synthesis Example 58/300 | 500 | 4 |
| 120 | 1010 | Synthesis Example 59/300 | 500 | 4 |
| 121 | 1010 | Synthesis Example 60/300 | 500 | 4 |
| 122 | 1010 | Synthesis Example 61/300 | 500 | 4 |

EXAMPLE 3

Each of the powder coating composition Nos. 1 to 122 obtained in Example 2 was applied, and the formed epfilm was measured for mechanical properties. The results of measurements are shown in Tables 8 to 11. Incidentally, the baking conditions of each composition applied was 100° C. and 20 minutes, and the measurements of film were conducted according to JIS 5400.

TABLE 8

| Composition No. | Pencil hardness | Erichsen test (mm) | Specular gloss (60) |
|---|---|---|---|
| 1 | 2H | 10 | 92 |
| 2 | 2H | 10 | 93 |
| 3 | 2H | 10 | 91 |
| 4 | 2H | 10 | 92 |
| 5 | 2H | 10 | 93 |
| 6 | 2H | 10 | 93 |
| 7 | 3H | 10 | 91 |
| 8 | 3H | 10 | 92 |
| 9 | 3H | 10 | 91 |
| 10 | 3H | 10 | 93 |
| 11 | 2H | 10 | 91 |
| 12 | 2H | 10 | 91 |
| 13 | 2H | 10 | 91 |
| 14 | 2H | 10 | 92 |
| 15 | 2H | 10 | 91 |
| 16 | 2H | 10 | 93 |
| 17 | 2H | 10 | 91 |
| 18 | 2H | 10 | 89 |
| 19 | 3H | 10 | 90 |
| 20 | 3H | 10 | 91 |
| 21 | 3H | 10 | 92 |
| 22 | 3H | 10 | 92 |
| 23 | 2H | 10 | 92 |
| 24 | 2H | 10 | 92 |
| 25 | 2H | 10 | 92 |

TABLE 8-continued

| Composition No. | Pencil hardness | Erichsen test (mm) | Specular gloss (60) |
|---|---|---|---|
| 26 | 2H | 10 | 90 |
| 27 | 2H | 10 | 93 |
| 28 | 2H | 10 | 89 |
| 29 | 2H | 10 | 90 |
| 30 | 2H | 10 | 91 |
| 31 | 2H | 10 | 92 |

TABLE 9

| Composition No. | Pencil hardness | Erichsen test (mm) | Specular gloss (60) |
|---|---|---|---|
| 32 | 2H | 10 | 91 |
| 33 | 2H | 10 | 89 |
| 34 | 2H | 10 | 90 |
| 35 | 2H | 10 | 91 |
| 36 | 2H | 10 | 92 |
| 37 | 2H | 10 | 92 |
| 38 | 2H | 10 | 92 |
| 39 | 2H | 10 | 92 |
| 40 | 2H | 10 | 92 |
| 41 | 2H | 10 | 90 |
| 42 | 2H | 10 | 93 |
| 43 | 2H | 10 | 93 |
| 44 | 2H | 10 | 91 |
| 45 | 2H | 10 | 92 |
| 46 | 2H | 10 | 91 |
| 47 | 2H | 10 | 93 |
| 48 | 2H | 10 | 91 |
| 49 | 2H | 10 | 91 |
| 50 | 2H | 10 | 91 |
| 51 | 2H | 10 | 93 |
| 52 | 2H | 10 | 93 |
| 53 | 2H | 10 | 91 |
| 54 | 2H | 10 | 92 |
| 55 | 2H | 10 | 91 |
| 56 | 2H | 10 | 93 |
| 57 | 2H | 10 | 91 |
| 58 | 2H | 10 | 91 |
| 59 | 2H | 10 | 91 |
| 60 | 2H | 10 | 90 |
| 61 | 2H | 10 | 91 |

TABLE 10

| Composition No. | Pencil hardness | Erichsen test (mm) | Specular gloss (60) |
|---|---|---|---|
| 62 | 2H | 10 | 92 |
| 63 | 2H | 10 | 91 |
| 64 | 2H | 10 | 93 |
| 65 | 2H | 10 | 91 |
| 66 | 2H | 10 | 89 |
| 67 | 2H | 10 | 90 |
| 68 | 3H | 10 | 91 |
| 69 | 3H | 10 | 92 |
| 70 | 3H | 10 | 90 |
| 71 | 3H | 10 | 92 |
| 72 | 2H | 10 | 91 |
| 73 | 2H | 10 | 91 |
| 74 | 2H | 10 | 91 |
| 75 | 2H | 10 | 92 |
| 76 | 2H | 10 | 91 |
| 77 | 2H | 10 | 93 |
| 78 | 2H | 10 | 91 |
| 79 | 2H | 10 | 89 |
| 80 | 3H | 10 | 90 |
| 81 | 3H | 10 | 91 |
| 82 | 3H | 10 | 92 |
| 83 | 3H | 10 | 90 |
| 84 | 2H | 10 | 92 |

TABLE 10-continued

| Composition No. | Pencil hardness | Erichsen test (mm) | Specular gloss (60) |
|---|---|---|---|
| 85 | 2H | 10 | 91 |
| 86 | 2H | 10 | 91 |
| 87 | 2H | 10 | 91 |
| 88 | 2H | 10 | 92 |
| 89 | 2H | 10 | 91 |
| 90 | 2H | 10 | 93 |
| 91 | 2H | 10 | 90 |
| 92 | 2H | 10 | 91 |

TABLE 11

| Composition No. | Pencil hardness | Erichsen test (mm) | Specular gloss (60) |
|---|---|---|---|
| 93 | 2H | 10 | 92 |
| 94 | 2H | 10 | 92 |
| 95 | 2H | 10 | 92 |
| 96 | 2H | 10 | 90 |
| 97 | 2H | 10 | 91 |
| 98 | 2H | 10 | 92 |
| 99 | 2H | 10 | 92 |
| 100 | 2H | 10 | 92 |
| 101 | 2H | 10 | 92 |
| 102 | 2H | 10 | 90 |
| 103 | 2H | 10 | 93 |
| 104 | 2H | 10 | 93 |
| 105 | 2H | 10 | 91 |
| 106 | 2H | 10 | 92 |
| 107 | 2H | 10 | 91 |
| 108 | 2H | 10 | 93 |
| 109 | 2H | 10 | 91 |
| 110 | 2H | 10 | 91 |
| 111 | 2H | 10 | 91 |
| 112 | 2H | 10 | 93 |
| 113 | 2H | 10 | 93 |
| 114 | 2H | 10 | 91 |
| 115 | 2H | 10 | 92 |
| 116 | 2H | 10 | 91 |
| 117 | 2H | 10 | 93 |
| 118 | 2H | 10 | 91 |
| 119 | 2H | 10 | 91 |
| 120 | 2H | 10 | 92 |
| 121 | 2H | 10 | 91 |
| 122 | 2H | 10 | 93 |

COMPARATIVE EXAMPLE 1

300 g of an epoxy resin as curing agent was added to 550 g of resin A. The mixture was applied and baked (cured) under the same conditions as in Example 3.

COMPARATIVE EXAMPLE 2

300 g of an epoxy resin as curing agent was added to 1,010 g of resin B. The mixture was applied and baked (cured) under the same conditions as in Example 3.

The results of Comparative Examples 1 and 2 are shown in Table 12.

TABLE 12

| Composition No. | Pencil hardness | Erichsen test (mm) | Specular gloss (60) |
|---|---|---|---|
| Comparative Example 1 | 2H | 18 | 70 |
| Comparative Example 2 | 2H | 20 | 65 |

As is clear from the above Examples and Comparative Examples, use of the present curing agent can provide a powder coating composition of low baking temperature. Therefore, this powder coating composition can be applied using the equipment used in application of conventional solvent type coatings.

Further, the present powder coating composition using the present curing agent, since it has a low baking temperature, can be applied even onto a substrate of insufficient heat resistance, or onto a substrate which has too large a heat capacity and is difficult to heat to a desired application temperature when used for conventional powder coatings.

Furthermore, the present powder coating film retains the excellent curing property possessed by ordinary powder coatings and can form an excellent cured film.

What is claimed is:

1. A powder coating composition comprising:
a curing agent for powder coating, which comprises, as a main component, a carbodiimide compound represented by the following formula (1):

$$OCN-R_1-(NCN-R_2)_{n1}-NCO \quad (1)$$

wherein $R_1$ and $R_2$ may be the same or different and are each a residue of an aliphatic, alicyclic, or aromatic diisocyanate; and n1 is an integer of 2 to 50, and
a bifunctional coating resin compound having a functional group reactive with a carbodiimide group and selected from the group consisting of an epoxy resin, an epoxy/polyester resin, a polyester resin; a polyester/polyurethane resin, and an acrylic resin,
said powder coating composition being curable at a temperature of 100 to 150° C.

2. A powder coating film, which is obtained by reacting and curing a curing agent for powder coating, which comprises, as a main component, a carbodiimide compound represented by the following formula (1):

$$OCN-R_1-(NCN-R_2)_{n1}-NCO \quad (1)$$

wherein $R_1$ and $R_2$ may be the same or different and are each a residue of an aliphatic, alicyclic, or aromatic diisocyanate; and n1 is an integer of 2 to 50, and
a bifunctional resin compound having a functional group reactive with a carbodiimide group and selected from the group consisting of an epoxy resin, an epoxy/polyester resin, a polyester resin; a polyester/polyurethane resin, and an acrylic resin,
said powder coating composition being curable at a temperature of 100 to 150° C.

3. A powder coating composition comprising:
a curing agent for powder coating, which comprises, as a main component, a carbodiimide compound represented by the following formula (2):

$$R_3-NCN-R_4-(NCN-R_5)_{n2}-NCN-R_6 \quad (2)$$

wherein $R_4$ and $R_5$ may be the same or different and are each a residue of an aliphatic, alicyclic, or aromatic diisocyanate; $R_3$ and $R_6$ may be the same or different and are each a residue of an aliphatic, alicyclic or aromatic monoisocyanate; and n2 is an integer of 0 to 48, and
a bifunctional coating resin compound having a functional group reactive with a carbodiimide group and selected from the group consisting of an epoxy resin, an epoxy/polyester resin, a polyester resin; a polyester/polyurethane resin, and an acrylic resin, said powder coating composition being curable at a temperature of 100 to 150° C.

4. A powder coating composition comprising:

a curing agent for powder coating, which comprises, as a main component, a carbodiimide compound represented by the following formula (3):

$$R_7-R_8-(NCN-R_9)_{n3}-R_{10} \qquad (3)$$

wherein $R_8$ and $R_9$ may be the same or different and are each a residue of an aliphatic, alicyclic, or aromatic diisocyanate; $R_7$ and $R_{10}$ may be the same or different and are each a residue formed by the reaction of an isocyanate group with an alcohol, an amine, a carboxylic acid or an acid anhydride; and n3 is an integer of 2 to 50, and a bifunctional coating resin compound having a functional group reactive with a carbodiimide group and selected from the group consisting of an epoxy resin, an epoxy/polyester resin, a polyester resin; a polyester/polyurethane resin, and an acrylic resin, said powder coating composition being curable at a temperature of 100 to 150° C.

5. A powder coating film, which is obtained by reacting and curing a curing agent for powder coating, which comprises, as a main component, a carbodiimide compound represented by the following formula (2):

$$R_3-NCN-R_4-(NCN-R_5)_{n2}-NCN-R_6 \qquad (2)$$

wherein $R_4$ and $R_5$ may be the same or different and are each a residue of an aliphatic, alicyclic, or aromatic diisocyanate; $R_3$ and $R_6$ may be the same or different and are each a residue of an aliphatic, alicyclic or aromatic monoisocyanate; and n2 is an integer of 0 to 48, and a bifunctional resin compound having a functional group reactive with a carbodiimide group and selected from the group consisting of an epoxy resin, an epoxy/polyester resin, a polyester resin; a polyester/polyurethane resin, and an acrylic resin, said powder coating film being curable at a temperature of 100 to 150° C.

6. A powder coating film, which is obtained by reacting and curing a curing agent for powder coating, which comprises, as a main component, a carbodiimide compound represented by the following formula (3):

$$R_7-R_8-(NCN-R_9)_{n3}-R_{10} \qquad (3)$$

wherein $R_8$ and $R_9$ may be the same or different and are each a residue of an aliphatic, alicyclic, or aromatic diisocyanate; $R_7$ and $R_{10}$ may be the same or different and are each a residue formed by the reaction of an isocyanate group with an alcohol, an amine, a carboxylic acid or an acid anhydride; and n3 is an integer of 2 to 50, and a bifunctional resin compound having a functional group reactive with a carbodiimide group and selected from the group consisting of an epoxy resin, a epoxy/polyester resin, a polyester resin; a polyester/polyurethane resin, and an acrylic resin, said powder coating film being curable at a temperature of 100 to 150° C.

* * * * *